United States Patent
Pini et al.

(10) Patent No.: US 6,965,985 B2
(45) Date of Patent: Nov. 15, 2005

(54) SIGN GENERATION BYPASS PATH TO ALIGNER FOR REDUCING SIGNED DATA LOAD LATENCY

(75) Inventors: David M. Pini, Mountain View, CA (US); Yuefei Ge, San Jose, CA (US); Anup S. Tirumala, San Jose, CA (US)

(73) Assignee: Sun Mirosystems, Inc., Santa Clara, CA (US)

( * ) Notice: Subject to any disclaimer, the term of this patent is extended or adjusted under 35 U.S.C. 154(b) by 446 days.

(21) Appl. No.: 09/994,479

(22) Filed: Nov. 27, 2001

(65) Prior Publication Data

US 2003/0101332 A1 May 29, 2003

(Under 37 CFR 1.47)

(51) Int. Cl.[7] ............................................. G06F 9/312
(52) U.S. Cl. .................... 712/225; 712/221; 712/300
(58) Field of Search ............................... 712/221, 225, 712/300; 708/204

(56) References Cited

U.S. PATENT DOCUMENTS

| | | | | |
|---|---|---|---|---|
| 5,638,312 A | * | 6/1997 | Simone ...................... 708/525 |
| 5,909,572 A | * | 6/1999 | Thayer et al. .............. 712/226 |
| 6,311,199 B1 | * | 10/2001 | Tamura et al. ............. 708/204 |
| 6,557,096 B1 | * | 4/2003 | Ganapathy et al. ........ 712/221 |
| 2002/0087839 A1 | * | 7/2002 | Jarvis et al. ............... 712/218 |

* cited by examiner

*Primary Examiner*—Kenneth S. Kim
(74) *Attorney, Agent, or Firm*—Osha Liang LLP

(57) ABSTRACT

A method for reducing signed load latency in a microprocessor has been developed. The method includes transferring a part of data to an aligner via a bypass, and generating a sign bit from the part of the data. The sign bit is transferred to the aligner along the bypass, and the data is separately transferred to the aligner along a data path.

9 Claims, 8 Drawing Sheets

SIGN GENERATION BYPASS PATH TO ALIGNER FOR REDUCING SIGNED DATA LOAD LATENCY

FIELD OF THE INVENTION

The present invention relates to the field of data loads in a microprocessor.

BACKGROUND OF THE INVENTION

Referring to FIG. 1, a typical computer system includes a microprocessor (10) having, among other things, a CPU (12), a memory controller (14), and an on-board cache memory (16). The microprocessor (10) is connected to an external cache memory (22) and a main memory (18) that both hold data and program instructions to be executed by the microprocessor (10). Internally, execution of program instructions is carried out by the CPU (12). Data needed by the CPU (12) to carry out an instruction are fetched by the memory controller (14) and loaded into internal registers (20) of the CPU (12). A memory queue (not shown) maintains a list of outstanding memory requests. The memory controller adds requests into the memory queue and also loads registers with values from the memory queue. Upon command from the CPU (12), the memory controller (14) searches for the data first in the on-board cache (16), then in external cache memory (level 2 cache) (22), and finally in the slow main memory (18).

Physically, different kinds of memory have significant differences in the performance characteristics. Such performance characteristics include: the time to read/write data in the particular location in memory; the total volume of information that can be stored; and the unit costs of storing a given piece of information. To optimize the performance, in general, a memory is organized into a hierarchy with the highest performing and the most expensive devices at the top, and with progressively lower-performing and less costly devices in succeeding layers. For example, cache memories, commonly Static Random Access Memory (SRAM), belong to the higher performing group. In contrast, main memories, commonly Dynamic Random Access Memory (DRAM), belong to the lower-performing group.

A memory may be considered as a two-dimensional array including a number of memory cells. Each cell holds one bit of information and is identified uniquely by using row and column addresses. The addresses are derived through row and column decoders according to instructions. FIG. 2 shows an example of cache memory configuration. When a CPU needs data, the memory controller looks for the data in the cache memory. The instructions are fed into inputs (120, 134) of row (122) and column decoders (124), which derive the addresses for the data. After the data is found in the memory (132), all or a part of the data may be selected for a specific operation according to the instruction. If the data needs to be written at the addresses, control unit (126) selects write unit (128) to feed data through input line (data_in) to write the data at the addresses. If the data needs to be read at the addresses, the control unit (126) chooses read unit (130) to read the data out from output line (data_out). Then, the data may be processed or transferred to the CPU through various elements in the microprocessor.

FIG. 3 shows an example of data transfer from a cache memory to another element in the microprocessor. In this example, data in SRAM (32) is transferred to stretcher (STR) (140), which adjusts the timing of signal. That is, the STR (140) shrinks or extends signal of the data to adjust the timing during data transfer. After the timing is adjusted, the data is transferred to a multiplexer (MUX) (34). At MUX (34), a part of the data may be selected using signal (36). The chosen data is then transferred to an aligner (38), which arranges the data in appropriate order and, if necessary, may assign a unique extension for data bits according to the instructions. Assigning a unique extension is explained below. Then, the aligner (38) transfers the data (40) into the other element in the microprocessor.

The data transfer may vary depending on the memory configuration. For example, a cache memory may be divided into banks. A bank is a memory block that typically is arranged to match the bit width of the data bus. A data bus is a path used to transfer data in a microprocessor. In this configuration, data from a cache memory may be transferred along multiple paths for each of the banks.

Referring to FIG. 4, a cache memory is divided into four banks (150, 152, 154, 156) and each bank outputs 64-bit data. The 64-bit data may be divided into four, 16-bit data arrays. For example, Bank 1 outputs four arrays to STR (140), which may extend or shrink the signal of the four arrays to adjust the timing to transfer data. Then, after the process is complete, the four arrays are transferred into MUX (34). A select signal (36) chooses one of the four arrays at the MUX (34). Finally, The chosen 16-bit data is transferred to aligner (38).

Thus, in this example, 16 bits of data are transferred from one of the four banks. In the same manner, 16 bits of data are transferred from each bank at a time Therefore, in this example, 64-bit data is transferred to aligner (38). Then, the Aligner (38) arranges the 64-bit data according to the instructions before transferring the data to another element in the microprocessor. If the 64-bit data must be converted to another type, the aligner (38) assigns a unique extension to the data. For example, if the 64-bit data must be converted into 32 bits, the aligner (38) may assign a 32-bit extension to the data. This process is known as signing data bits.

The latency of the above system is generally determined by the signing process, because that process consumes the most time during the data transfer.

SUMMARY OF THE INVENTION

In some aspects, the invention relates to an apparatus for reducing signed load latency in a microprocessor. The apparatus includes: a data path connecting a cache memory to an aligner; and a bypass connecting the cache memory to the aligner. The data is transferred from the cache memory to the aligner via the data path, and a sign bit for the data is transferred from the cache memory to the aligner via the bypass. In some embodiments, the apparatus further includes a select component for providing a signal to generate the sign bit for the data. In some embodiments, the bypass includes a sign multiplexer and a real-sign multiplexer.

In some aspects, the invention relates to an apparatus for reducing signed load latency in a microprocessor. The apparatus includes: a data path connecting a cash memory to an aligner; and a bypass connecting the cash memory to the aligner. The data is transferred from the cache memory to the aligner via the data path, and a sign bit for the data is transferred to the cache memory to the aligner via the bypass. In some embodiments, the apparatus further includes a select component for providing a signal to generate the sign bit for the data. In some embodiments, the bypass includes a sign multiplexer and a real-sign multiplexer.

In some aspects, the invention relates to an apparatus including: means for transferring data from a cache memory to an aligner; means for generating a sign bit for the data; means for transferring the sign bit to the aligner via a bypass; means for adjusting the data during transfer to the aligner via a data path; means for adjusting the sign bit during transfer to aligner via the bypass; means for selectively processing a part of data for use in generating the sign bit; and means for selectively processing the part of the data selected for use in generating the signed bit based on an instruction from a CPU.

In some aspects, the invention relates to an apparatus including: a data path connecting a cache memory to an aligner; a bypass connecting the cache memory to the aligner; wherein data is transferred from the cache memory to the aligner along the data path and a sign bit for the data is transferred from the cache memory to the aligner along the bypass; a select component for providing a signal to generate the sign bit for the data, wherein the select component comprises a sign multiplexed; and a real-sign multiplexed, and wherein the select component provides a signal for choosing a part of the data to generate the sign bit for the data based on an instruction from a CPU; and wherein the aligner comprises a plurality of sub-aligners.

Other aspects and advantages of the invention will be apparent from the following description and the appended claims.

DETAILED DESCRIPTION OF THE INVENTION

Exemplary embodiments of the invention will be described with reference to the accompanying drawings. Generally, the present invention involves a method of reducing signed load latency in a microprocessor.

To achieve the reduction of the latency originating from signing bit data in a microprocessor, the present invention involves a method and apparatus for selectively processing data by generating at least one bypass, and then transferring signed bits along the bypass.

Figure 1:
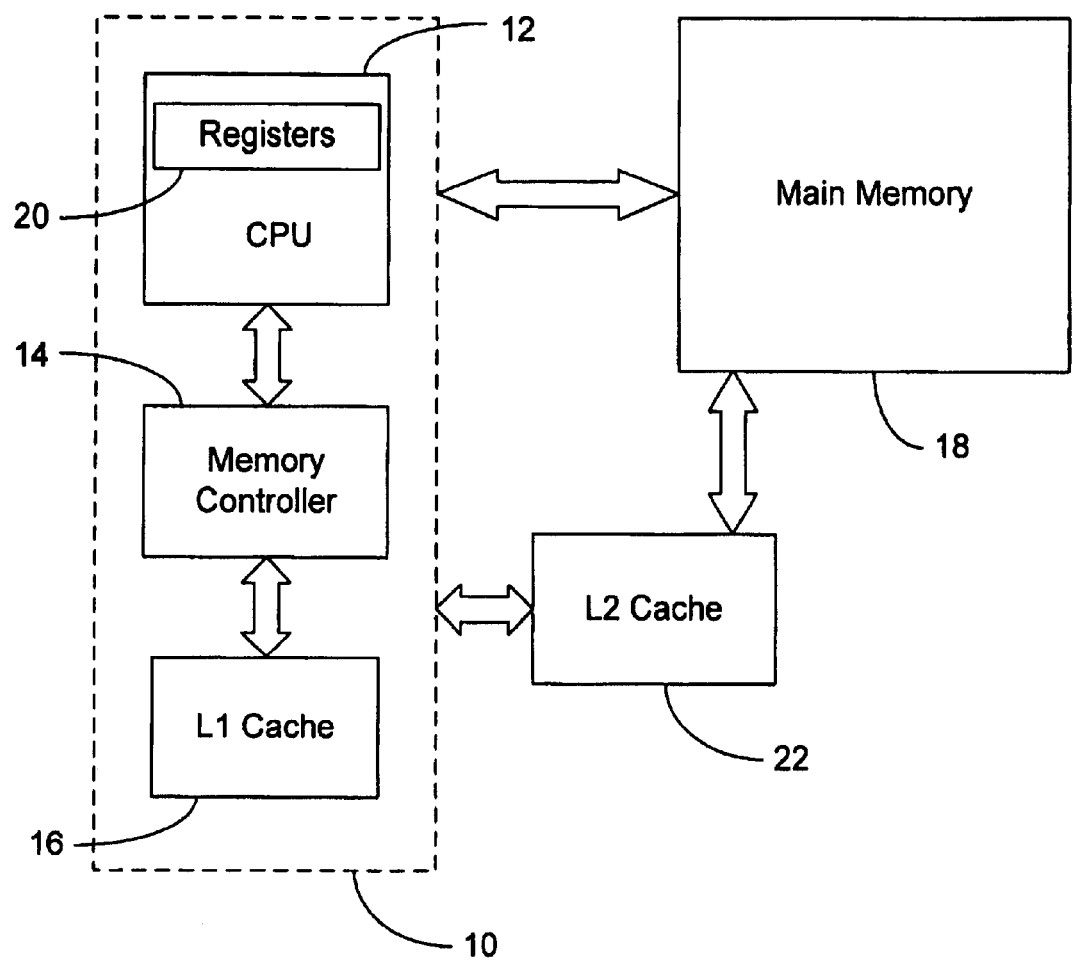
FIG. 1 shows a simplified diagram of a microprocessor and memory architecture.
Figure 2:
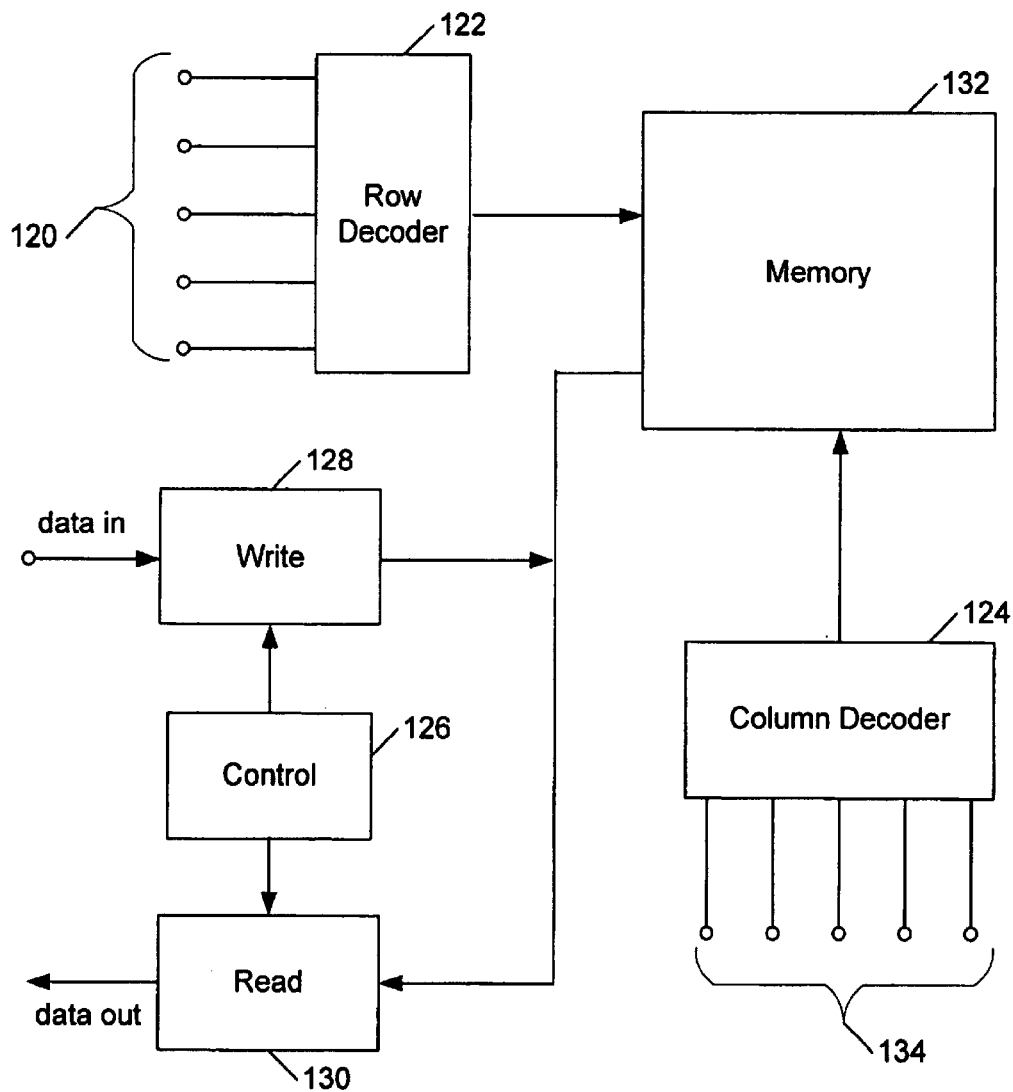
FIG. 2 shows an example of cache memory configuration.
Figure 3:
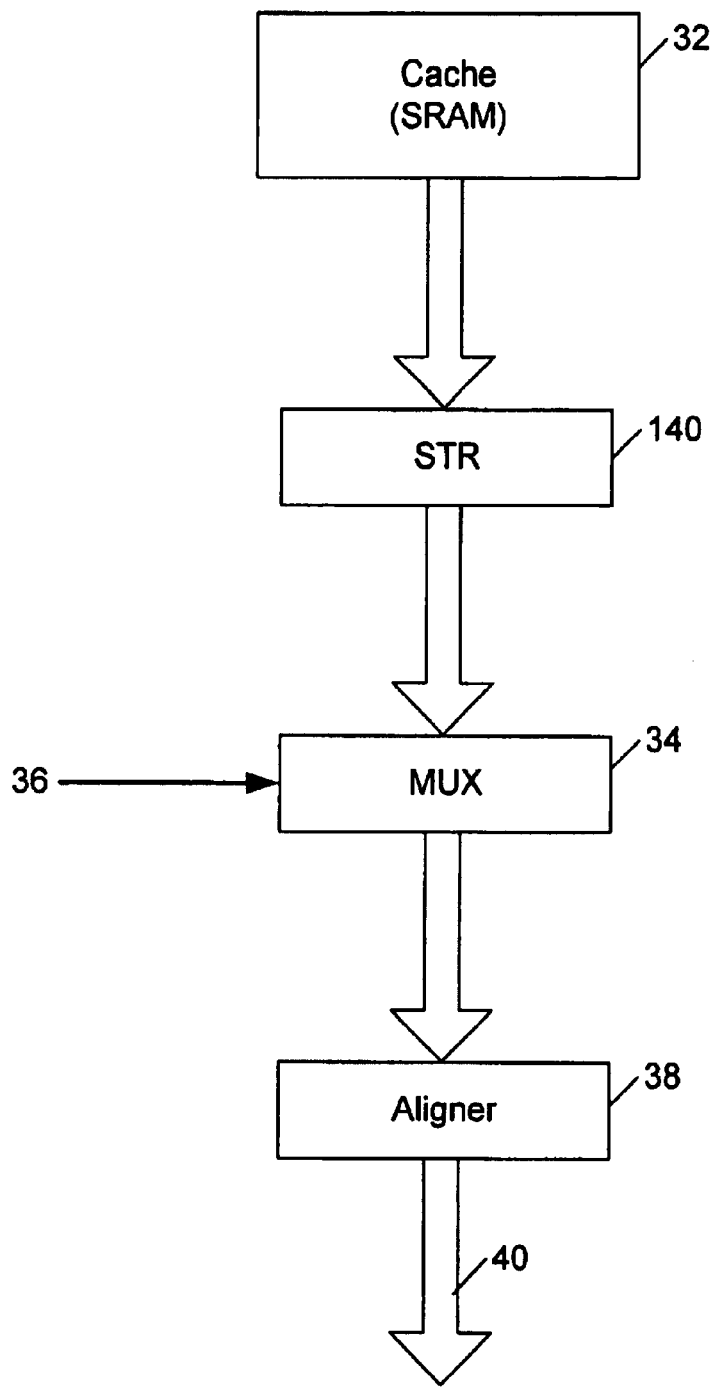
FIG. 3 shows an example of data transfer from a cache memory to another element in the microprocessor.
Figure 4:
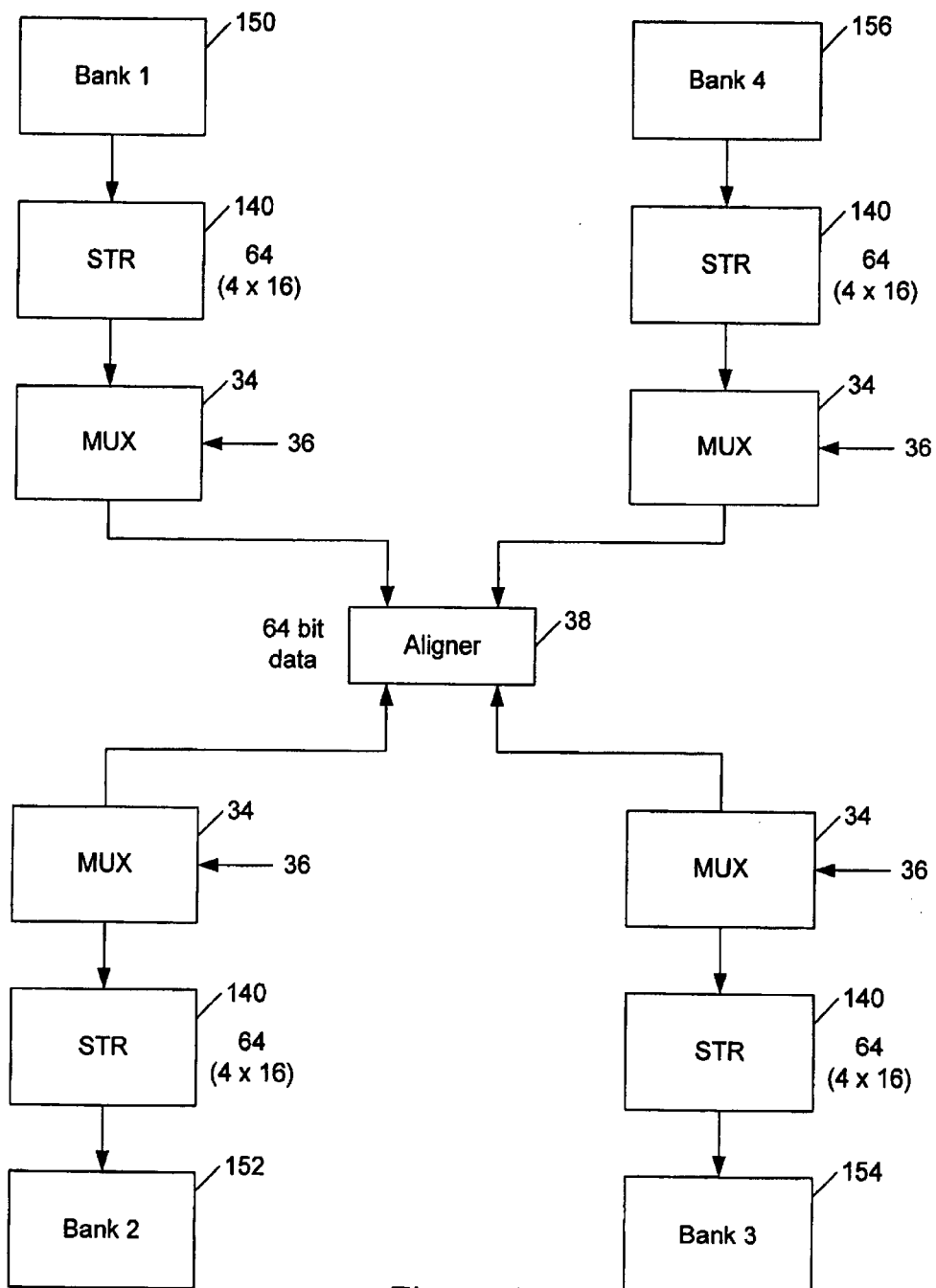
FIG. 4 shows an example of data transfer to an aligner from four banks in a cache memory.
Figure 5:
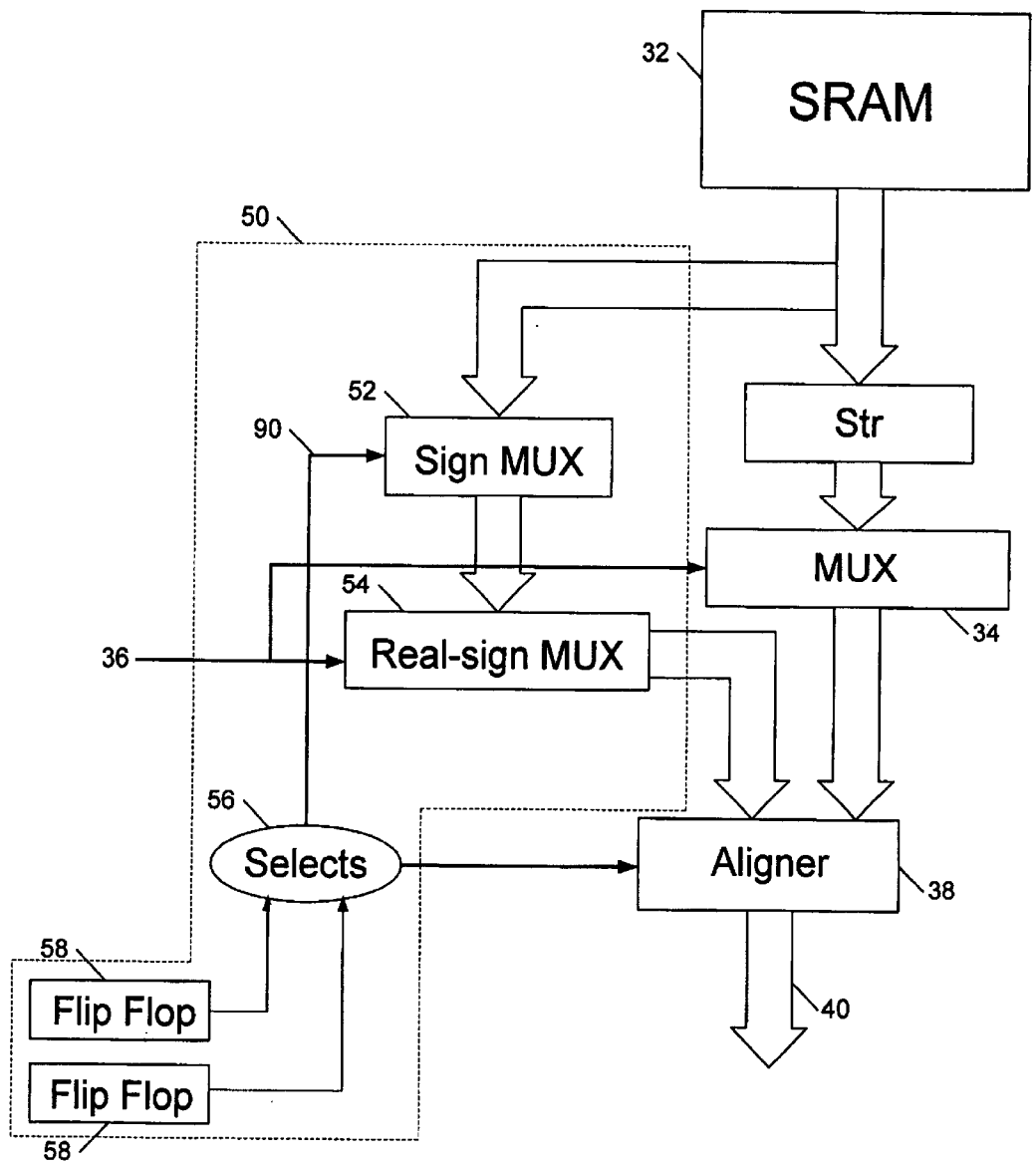
FIG. 5 shows an example of cache memory architecture in accordance with an embodiment of the present invention.

FIG. 5 shows an example of circuitry in accordance with an embodiment of the present invention. In this example, a bypass (50) is introduced to transfer candidate bits differently from a data path to the aligner (38). The candidate bits are a group of bits, which include a sign bit for data to be transferred to aligner (38) along the data path. To obtain the candidate bits, data bits are selectively arranged and then transferred along the bypass (50). The data and candidate bit arrangement will be described below.

The bypass (50) includes Sign MUX (52), Real-sign MUX (54), Select (56), and Flip Flops (58). First, the outputs from the SRAM (32) are arranged into groups of data bits. Then, along the bypass (50), a part of the bit data is chosen from each group. Each chosen part is rearranged and gathered into one group. This group includes candidates for a sign bit for data and is transferred to the aligner (38) along the data path. Next, the candidate bits are transferred into the Sign MUX (52). A part of the candidate bits is selected by using a select signal (90) from the select (56).

In this embodiment, the sources of the select signal (90) are provided by the Flip Flops (58), which are arranged not to affect the timing of the candidate bits.

The selected candidate bits at the Sign MUX (52) are transferred to the Real-sign MUX (54). One of the candidate bits is chosen using a signal (36). A chosen bit is called the "real-sign bit", which is a sign bit for data to be transferred to the aligner (38) along the data path. Then, the real-sign bit is transferred to the aligner (38).

Along the data path to the aligner (38), the outputs from the SRAM are transferred to Stretcher (STR) (140). Then, after the data is shrunk or extended for timing purposes, the data is transferred to MUX (34). A part of the data is chosen at MUX (34) and then transferred to the aligner (38). The data is arranged in proper order using a signal (92) from the select (56). The sources of signal at the select (56) are provided by Flip-Flops (58) according to the instructions. Then, after the arrangement is complete, the data is transferred into another element in the microprocessor.

To process data in this manner, bit data are arranged to have all possible candidate bits located next to each other. To achieve this arrangement, the transferred candidate bits may be treated as byte information in each stage of the arrangement. An exemplary arrangement technique is described below.

Figure 6:
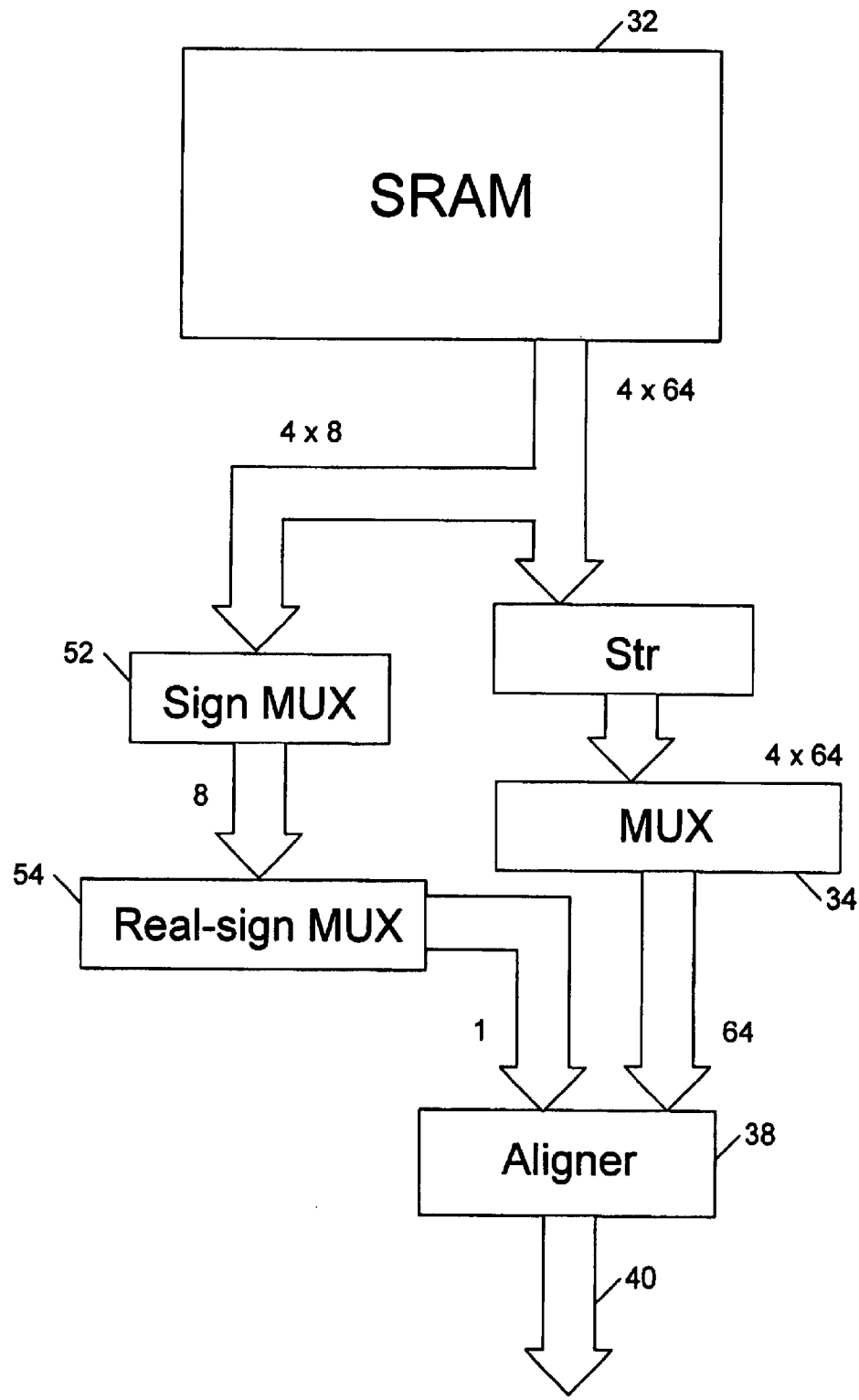
FIG. 6 shows an example of data and candidate bits during data transfer in accordance with an embodiment of the invention.

FIG. 6 shows an example of arrangement of data and candidate bit sets during transfer from the SRAM (32) to another element in the microprocessor. In this example, the SRAM includes 4 memory banks, and each bank outputs 64-bit data in four arrays of 16-bit data. Thus, the total outputs are 256 (four 64) bit data. These bit data are transferred to the STR (140) and then the MUX (34) along the data path. At the MUX (34), one of the four 64 bit data is chosen. The chosen data is transferred to the aligner (38).

Figure 7:
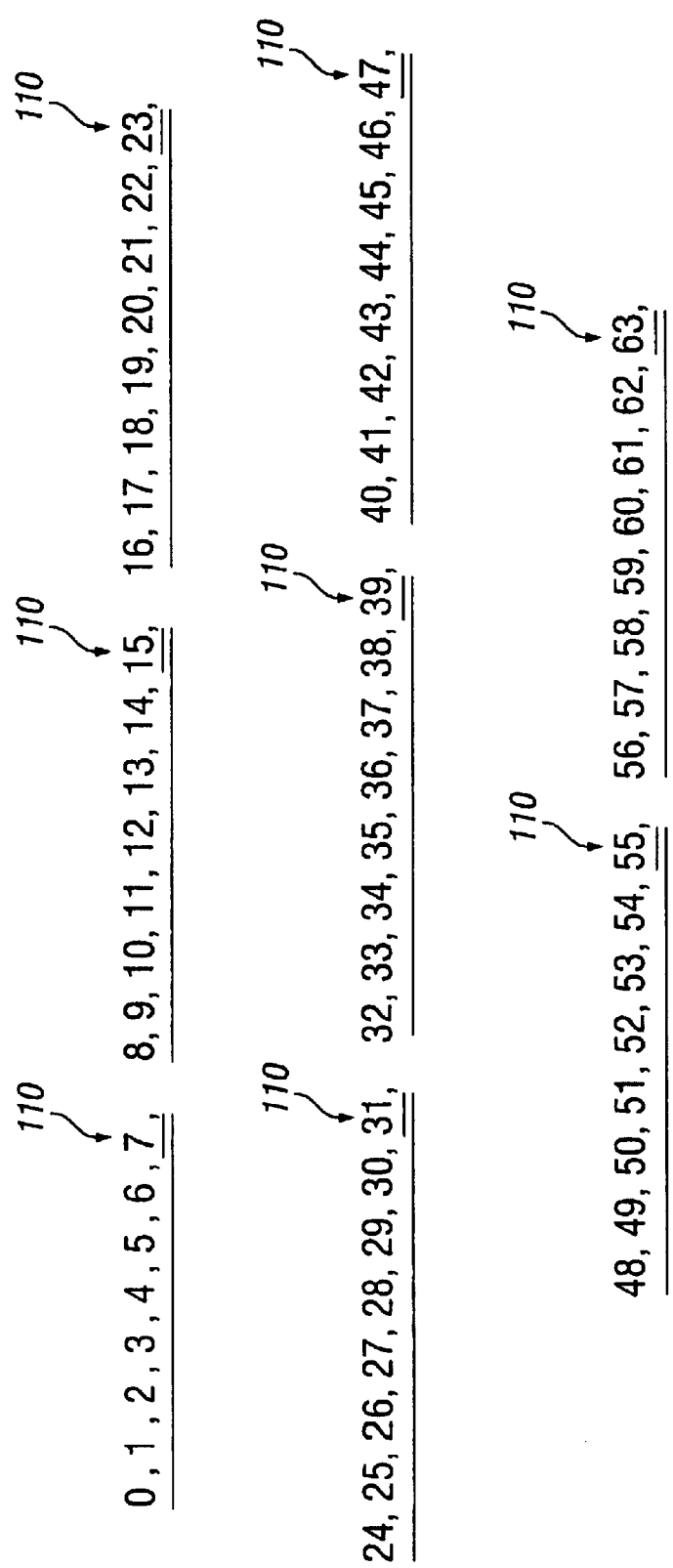
FIG. 7 shows an example of obtaining the most significant bits from 64 candidate bits in accordance of an embodiment of the invention.

Separately, the outputs from the SRAM are rearranged to transfer candidate bits for the chosen data at the MUX (34). In this embodiment, candidate bits are derived from the most significant bits (MSBs) in bytes of data. FIG. 7 shows an example of how to obtain the MSBs from 64-bit data. In this example, the 64-bit data is rearranged into groups of bytes. Thus, the 64-bit data may be considered as 8-byte data.

An MSB is located at the highest bit number in each byte. For example, in the first byte, a bit starts from 0 and ends at 7. Therefore, the MSB is 7. The other MSBs are obtained in the same manner. As can be seen, the MSBs (110) may be determined as 7 (110a), 15 (110b), 23 (110c), 31 (110d), 39 (110e), 47 (110f), 55 (110g), and 63 (110h). Therefore, eight MSBs (110) are derived from this 64 bit data. In the same manner, three groups of eight MSBs are derived from the other three groups of 64-bit data. As a result, four groups of eight MSBs are obtained from four 64-bit data groups.

Referring back to FIG. 6, the four groups of eight MSBs are transferred to Sign MUX (52) as candidate bits for the data. These candidate bits are transferred from the SRAM (32) along the data path to the aligner (38). At the Sign MUX (52), one of the four groups is chosen and then transferred to Real-sign MUX (54). At the Real-sign MUX (54), one of the eight MSBs is chosen as a real-sign bit and transferred to the aligner (38). According to the instructions, the Aligner (38) arranges the real-sign bit together with the 64-bit data transferred along the data path.

Figure 8:
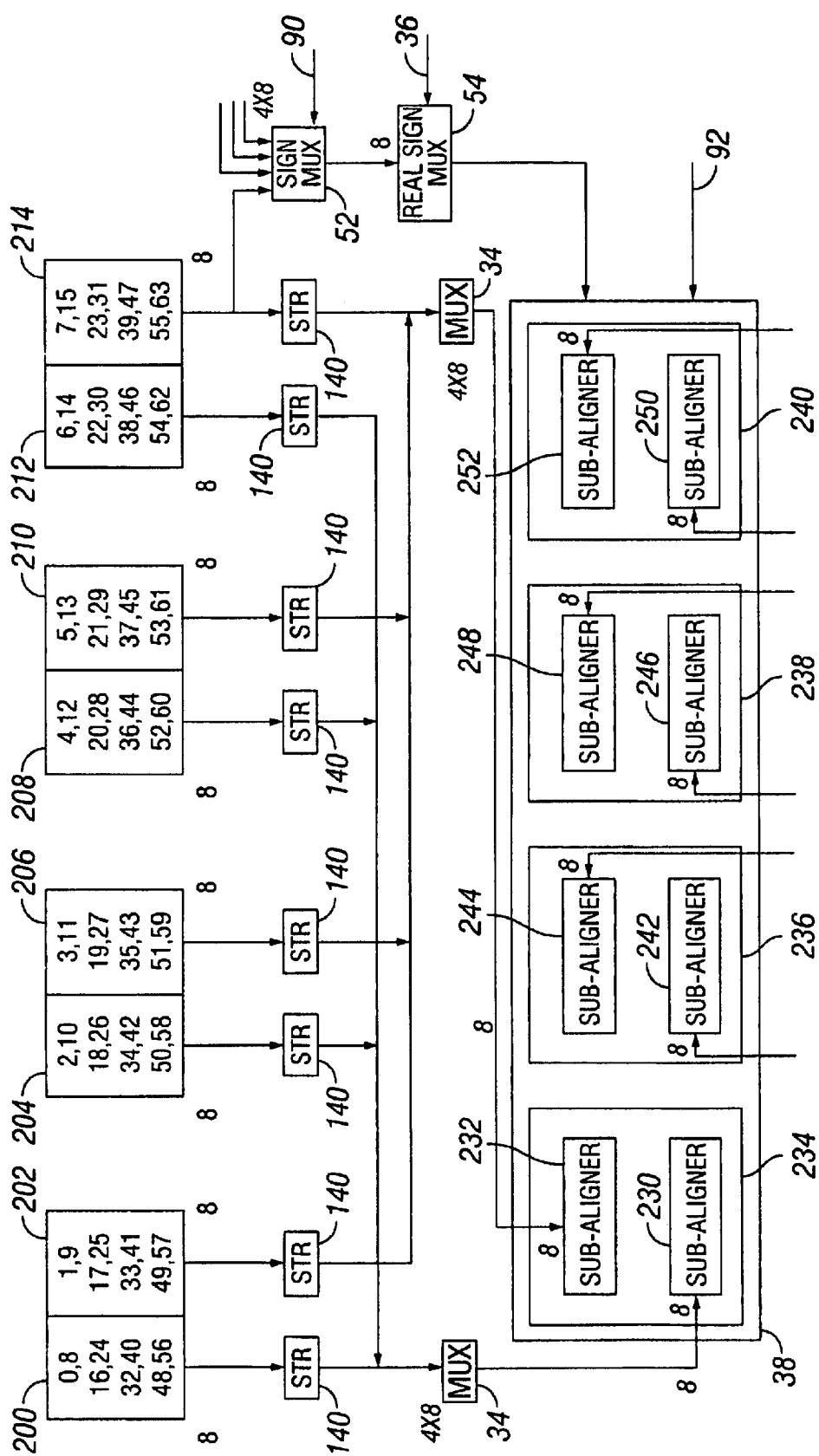
FIG. 8 shows an example of data and candidate bit transfer in a cache memory in accordance with an embodiment of the invention.

To implement this scheme, 64-bit data as shown in FIG. 7 may be rearranged into arrays of data. Referring to FIG. 8, the 64-bit data is sorted out into arrays of 8-bit data. This arrangement includes eight arrays: array 1 (200), array 2 (202), array 3 (204), array 4 (206), array 5 (208), array 6 (210), array 7 (212), and array 8 (214). These arrays are listed from the left to the right in this example. Each bit of data from the 64-bit data is sequentially allocated into an array, starting from array 1. When bit data is allocated in the last array, i.e., array 8 (214)), by returning to the first array, the next bit is allocated in the first array, i.e., the array 1 (210). This process repeats until all bit data are allocated in the arrays. In this example, all MSBs as shown in FIG. 7 are located next to each other in array 8 (214). Thus, this array may be transferred to the aligner (38) along the bypass (50).

In this example, there are four groups of such eight MSB arrays in the 256 bit outputs from SRAM (32) as shown in FIG. 6. Thus, 32 candidate bits (four groups of eight MSBs) are obtained and then transferred to the sign MUX (52). At sign MUX (52), one of the four groups is selected and then sent to the Real-sign MUX (54). At the Real-sign MUX (54), a real-sign bit is selected out of the eight MSBs. Thus, a real-sign bit is selected during the transfer along the bypass before reaching the aligner (38). As a result, the aligner (38) does not need to select a real-sign bit.

On the other hand, referring back to FIG. 8, all bit data are transferred to the aligner (38) along the data paths. In this example, odd-numbered arrays (200, 204, 208, 212) are gathered and transferred into MUX (34a) along STRs (140a, b, c, d). At the MUX (34a), one of the arrays is selected and transferred into a sub-aligner (230). The sub-aligner (232) may be a part of Aligner (38). In the same manner, even-numbered arrays (202, 206, 210, 214) are gathered and then transferred into MUX (34b) along STRs (140e, f, g, h). One of the arrays is selected and transferred into a sub-aligner (232). Thus, in this case, 16-bit data (two arrays of eight bit data) are transferred into a part (234) of the aligner (38) from a bank. This technique may apply to each bank of the memory. In this example, there are four banks (150, 152, 154, 156). Therefore, 64-bit data (four 16 bit data) is transferred to the aligner (38) from the banks (150, 152, 154, 156) without signing data bit at the aligner (38).

Further, the aligner (38) may be divided into blocks with a number of sub-aligners as shown. In this example, the aligner (38) is divided into four blocks (234, 236, 238, 240) and each block has two sub-aligners. Thus, the aligner (380) can accommodate all four banks (150, 152, 154, 156). The first block (234) has two aligners (230, 232) for bank 1 (150), the second block (236 has two aligners (242, 244) for bank 2 (152), the third block (238) has two aligners (246, 248) for bank 3 (154), and the fourth block (240) has two aligners (250, 252) for bank 4 (156). In this case, each sub-aligner handles 8-bit data. However, the size of the sub-aligner may vary depending on the applications.

Advantages of the present invention may include one or more of the following: In one or more embodiments, one of the MSBs (110) is chosen as a real-sign bit at the Real-sign MUX (54) and used to generate the real-sign bit ahead of the aligner (38). This achieves the processing of signed loads with the same latency as unsigned loads. As a result, the latency originating from signing data bits in a cache memory is reduced and the performance of the microprocessor is increased. This configuration may also reduce the size of a cache memory.

For example, the Sign MUX (52) and the Real-sign MUX (54) are used to select a real-sign bit from candidate bits in 256-bit outputs from SRAM (32) with four banks (150,152, 154,156). However, this scheme similarly applies to other configurations of cache memories.

While the invention has been described with respect to a limited number of embodiments, those skilled in the art will appreciate that other embodiments can be devised which do not depart from the scope of the invention as disclosed herein. Accordingly, the scope of the invention should be limited only by the attached claims.

What is claimed is:

1. A method for reducing signed load latency in transfer of data from a cache memory to another element in a microprocessor comprising:
   transferring data from the cache memory to a bypass path and a data path;
   transferring the data to an aligner from the data path;
   generating a sign bit for the data in the bypass path, wherein the generating comprises:
     selecting a plurality of candidate bits from the data, and
     generating the sign bit from the plurality of candidate bits dependent on a select signal, wherein the sign bit is generated independent of propagation of the data through the data path;
   transferring the sign bit to the aligner from the bypass path;
   arranging the data and the sign bit in the aligner into signed data; and
   transferring the signed data to the another element.

2. The method of claim 1, further comprising:
   adjusting the data during transfer to the aligner via the data path.

3. The method of claim 1, further comprising:
   processing the part of the data selected for use in generating the sign bit based on an instruction from a CPU.

4. An apparatus for reducing signed load latency in transfer of data from a cache memory to another element in a microprocessor, comprising:
   a data path connecting the cache memory to an aligner, wherein data is transferred from the cache memory to the aligner via the data path; and
   a bypass path connecting the cache memory to the aligner, comprising:
     a sign multiplexer for selecting a plurality of candidate bits from the data in the cache memory; and
     a real-sign multiplexer for selecting a sign bit from the plurality of candidate bits dependent on a select signal, wherein the sign bit is selected independent of propagation of data through the data path,
   wherein the sign bit is transferred to the aligner from the bypass path, and
   wherein the aligner arranges the data and the signed bit into signed data and transfers the signed data to the another element.

5. The apparatus of claim 4, further comprising:
   a select component for providing a select signal to choose the sign bit from a plurality of candidate bits.

6. The apparatus of claim 5, wherein the select component provides a signal to choose a part of the data and to generate the sign bit for the data based on an instruction from a CPU.

7. The apparatus of claim 4, wherein the aligner comprises a plurality of sub-aligners.

8. An apparatus comprising:
- means for transferring data from a cache memory to a bypass path and a data path;
- means for generating a sign bit for the data in the bypass path, wherein the means for generating a sign bit for the data comprises:
  - means for selecting a plurality of candidate bits from the data, and
  - means for generating the sign bit from the plurality of candidate bits dependent on a select signal,
  - wherein the sign bit is generated independent of propagation of data through the data path;
- means for transferring the sign bit to the aligner via the bypass path;
- means for adjusting the data during transfer to the aligner via the data path;
- means for adjusting the sign bit during transfer to the aligner via the bypass path; and
- means for selectively processing the part of the data selected for use in generating the sign bit based on an instruction from a CPU;
- means for arranging the data and the sign bit into signed data; and
- means for transferring the signed data to another element in a microprocessor.

9. An apparatus comprising:
- a data path connecting a cache memory to an aligner;
  - wherein data is transferred from the cache memory to the aligner along the data path;
- a bypass path connecting the cache memory to the aligner;
  - wherein the data is transferred from the cache memory to the bypass path, and
  - wherein a sign bit is transferred to the aligner from the bypass path;
- a select component in the bypass path for providing signals to select the sign bit for the data, wherein the select component comprises:
  - a sign multiplexer for selecting a plurality of candidate bits from the data; and
  - a real-sign multiplexer for selecting the sign bit from the plurality of candidate bits,
- wherein the select component provides a signal for selecting a part of the data to generate the sign bit for the data based on an instruction from a CPU;
- wherein the aligner comprises a plurality of sub-aligners; and
- wherein the aligner arranges the data and the sign bit into signed data.

* * * * *